United States Patent
Breese et al.

(10) Patent No.: US 7,178,423 B2
(45) Date of Patent: Feb. 20, 2007

(54) NOISE AND VIBRATION DAMPER FOR A VEHICULAR DRIVESHAFT ASSEMBLY

(75) Inventors: Douglas E. Breese, Walbridge, OH (US); Kellie L. Stevens, Ypsilanti, MI (US)

(73) Assignee: Torque-Traction Technologies LLC, Holland, OH (US), .

( * ) Notice: Subject to any disclaimer, the term of this patent is extended or adjusted under 35 U.S.C. 154(b) by 406 days.

(21) Appl. No.: 10/306,394

(22) Filed: Nov. 27, 2002

(65) Prior Publication Data
US 2004/0099087 A1    May 27, 2004

(51) Int. Cl.
*F16F 15/12*    (2006.01)
(52) U.S. Cl. .................. 74/574.4; 464/127; 464/90; 464/91; 188/266.1; 74/572.2; 74/604
(58) Field of Classification Search .................. 74/574, 74/573 R, 572, 604, 574.4, 572.2; 464/127, 464/180, 89–91; 428/64.1; 29/892.1, 892.11; 123/192.1; 188/266.1; 156/245; 403/359.1; *F16D 3/12*; *F16F 15/12*
See application file for complete search history.

(56) References Cited

U.S. PATENT DOCUMENTS

| | | | | |
|---|---|---|---|---|
| 2,477,081 | A * | 7/1949 | Peirce | 74/574.4 |
| 3,693,402 | A * | 9/1972 | Jones | 73/11.05 |
| 4,302,986 | A * | 12/1981 | Shepherd | 74/574.4 |
| 4,406,640 | A * | 9/1983 | Franklin et al. | 464/91 |
| 4,551,115 | A | 11/1985 | Ferguson | |
| 4,722,618 | A | 2/1988 | Matsumoto et al. | |
| 5,036,726 | A * | 8/1991 | Wolf et al. | 74/574.4 |
| 5,145,025 | A | 9/1992 | Damian | |
| 5,168,774 | A * | 12/1992 | Andra et al. | 74/574.4 |
| 5,299,468 | A | 4/1994 | Withers | |
| 5,465,485 | A * | 11/1995 | Miyake et al. | 29/892.11 |
| 5,843,264 | A * | 12/1998 | Mabuchi et al. | 156/245 |

(Continued)

FOREIGN PATENT DOCUMENTS

EP    0 101 015    2/1984

(Continued)

*Primary Examiner*—Vinh T. Luong
(74) *Attorney, Agent, or Firm*—MacMillan, Sobanski & Todd, LLC

(57) ABSTRACT

A noise and vibration damper for use with a rotatable structure, such as a driveshaft assembly for a vehicular drive train system, includes an inner member, an elastomeric member that extends about the inner member, and an outer member that extends about the elastomeric member. The inner member is formed from a sheet of material that has been deformed to a desired shape, while the outer member is formed from a tube of material having a length that is selected to provide the desired dampening frequency. The natural resonant frequency of the noise and vibration damper can be adjusted by varying either or both of the shape of the inner member or the axial length of the outer member of the noise and vibration damper. In both instances, the weight distribution of the components of the noise and vibration damper is altered. As a result, the rotational inertia (and, therefore, the natural resonant frequency) of the noise and vibration damper can be altered to absorb the undesirable noise and vibration applied to the drive train system and to minimize the amount of such noise and vibration that is transmitted and amplified by the drive train system.

11 Claims, 4 Drawing Sheets

U.S. PATENT DOCUMENTS

| | | | |
|---|---|---|---|
| 5,868,517 A * | 2/1999 | Aoki et al. | 403/359.1 |
| 5,931,737 A | 8/1999 | Aota et al. | |
| 5,966,996 A | 10/1999 | Hamaekers | |
| 5,988,015 A * | 11/1999 | Riu | 74/574 |
| 6,612,279 B2 * | 9/2003 | Asahara | 123/192.1 |
| 6,875,113 B2 * | 4/2005 | Nichols | 464/90 |
| 6,984,432 B2 * | 1/2006 | Tagawa et al. | 428/64.1 |
| 7,047,644 B2 * | 5/2006 | Hodjat | 29/892.1 |
| 2003/0203758 A1 * | 10/2003 | Guo et al. | 464/89 |

FOREIGN PATENT DOCUMENTS

| | | |
|---|---|---|
| GB | 1534675 | 12/1978 |
| GB | 2317215 | 3/1998 |
| GB | 2388176 | 11/2003 |
| GB | 2389163 | 12/2003 |

* cited by examiner

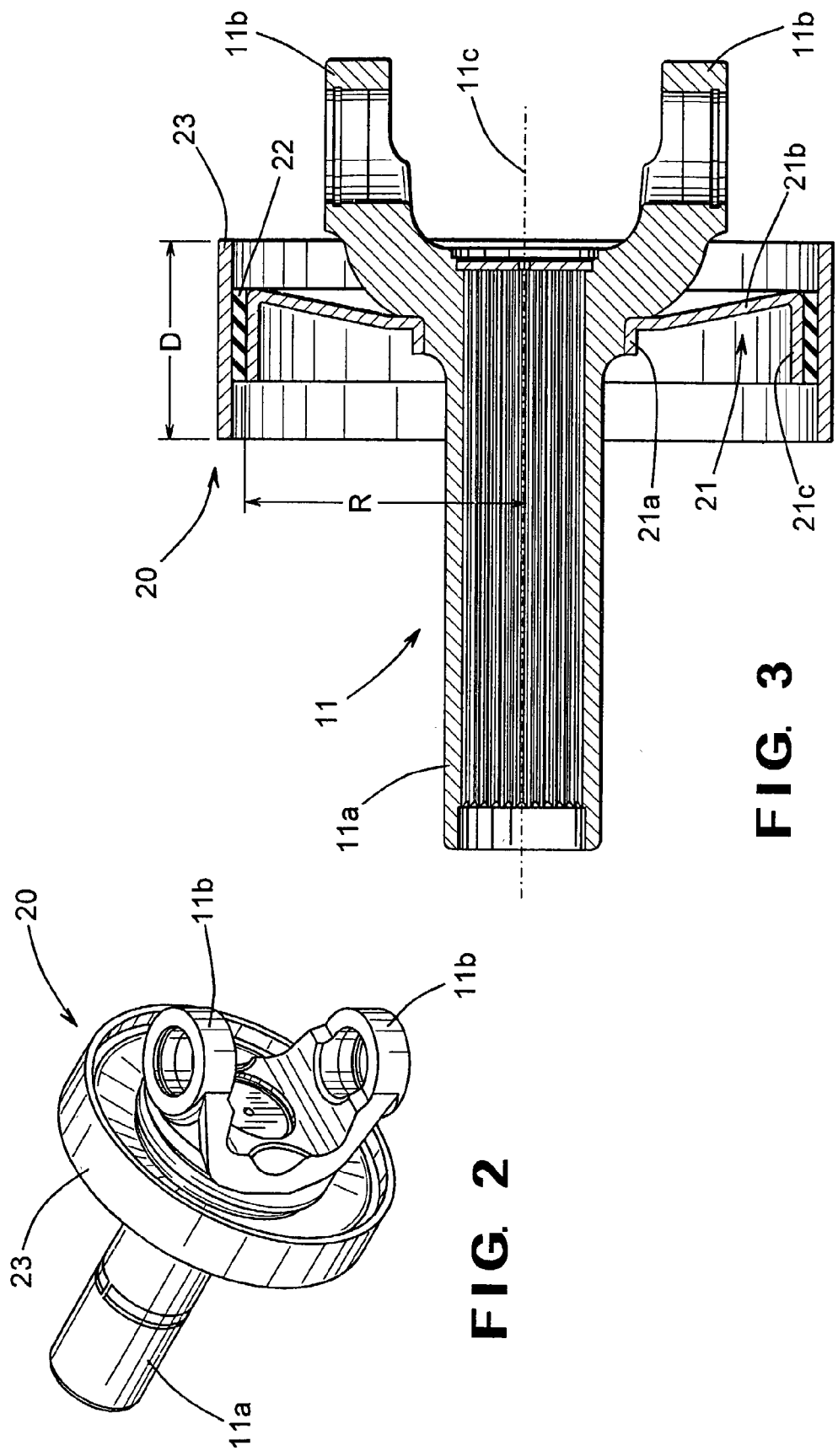

NOISE AND VIBRATION DAMPER FOR A VEHICULAR DRIVESHAFT ASSEMBLY

BACKGROUND OF THE INVENTION

This invention relates in general to noise and vibration dampening structures for use with rotating articles, such as a driveshaft assembly in a vehicular drive train system. In particular, this invention relates to an improved structure and method of manufacturing such a noise and vibration damper for use on a component of a vehicular driveshaft assembly.

Drive train systems are widely used for generating power from a source and for transferring such power from the source to a driven mechanism. Frequently, the source generates rotational power, and such rotational power is transferred from the source to a rotatably driven mechanism. For example, in most land vehicles in use today, an engine/transmission assembly generates rotational power, and such rotational power is transferred from an output shaft of the engine/transmission assembly through a driveshaft assembly to an input shaft of an axle assembly so as to rotatably drive the wheels of the vehicle. To accomplish this, a typical driveshaft assembly includes a hollow cylindrical driveshaft tube having a pair of end fittings, such as a pair of tube yokes, secured to the front and rear ends thereof. The front end fitting forms a portion of a front universal joint that connects the output shaft of the engine/transmission assembly to the front end of the driveshaft tube. Similarly, the rear end fitting forms a portion of a rear universal joint that connects the rear end of the driveshaft tube to the input shaft of the axle assembly. The front and rear universal joints provide a rotational driving connection from the output shaft of the engine/transmission assembly through the driveshaft tube to the input shaft of the axle assembly, while accommodating a limited amount of angular misalignment between the rotational axes of these three shafts.

One problem that is often encountered in vehicular driveshaft assemblies and other rotatable structures is that they tend to transmit and amplify undesirable noise and vibration that are encountered during operation. For example, in the context of the above-described vehicular drive train system, it is known that the meshing of the gears contained within the engine/transmission assembly and within the axle assembly can generate undesirable noise and vibration. Such noise and vibration can be transmitted and amplified by the relatively lengthy driveshaft assembly that is connected to the output shaft of the engine/transmission assembly and to the input shaft of the axle assembly, as described above. In order to provide the passengers with a more quiet and comfortable ride, it has been found to be desirable to minimize the transmission and amplification of such noise and vibration by the vehicular driveshaft assembly.

To accomplish this, it is known to provide a noise and vibration damper on one or more components of the vehicular driveshaft assembly. A typical noise and vibration damper includes an inner annular member that is press fit onto an outer surface of the component of the driveshaft assembly, an outer annular member that is disposed about the inner annular member, and a layer of an elastomeric material that extends between the inner and outer annular members. In the past, the inner annular member has been formed from a ring of steel that was machined to a desired shape, while the outer annular member has been formed from a ring of steel or cast iron that was also machined to a desired shape. Although effective, this structure has been found to be relatively heavy and expensive to manufacture. Thus, it would be desirable to provide an improved structure and method of manufacturing a noise and vibration damper for use with a rotatable structure, such as a driveshaft assembly for a vehicular drive train system, that is lighter and less expensive to manufacture than known dampers.

SUMMARY OF THE INVENTION

This invention relates to an improved structure and method of manufacturing a noise and vibration damper for use with a rotatable structure, such as a driveshaft assembly for a vehicular drive train system, that is relatively light and inexpensive to manufacture. The noise and vibration damper includes an inner member, an intermediate elastomeric member that extends about the inner member, and an outer member that extends about the intermediate elastomeric member. The inner member is formed from a sheet of material that has been deformed to a desired shape, while the outer member is formed from a tube of material having a length that is selected to provide the desired dampening frequency. The natural resonant frequency of the noise and vibration damper can be adjusted by varying either or both of the shape of the inner member or the axial length of the outer member of the noise and vibration damper. In both instances, the weight distribution of the components of the noise and vibration damper is altered. As a result, the rotational inertia (and, therefore, the natural resonant frequency) of the noise and vibration damper can be altered to absorb the undesirable noise and vibration applied to the drive train system and to minimize the amount of such noise and vibration that is transmitted and amplified by the drive train system.

Various objects and advantages of this invention will become apparent to those skilled in the art from the following detailed description of the preferred embodiment, when read in light of the accompanying drawings.

BRIEF DESCRIPTION OF THE DRAWINGS

FIG. 2 is an enlarged perspective view of the noise and vibration damper and the slip yoke illustrated in FIG. 1.

FIG. 3 is a further enlarged sectional elevational view of the noise and vibration damper and the slip yoke illustrated in FIGS. 1 and 2.

DETAILED DESCRIPTION OF THE PREFERRED EMBODIMENT

Figure 1:
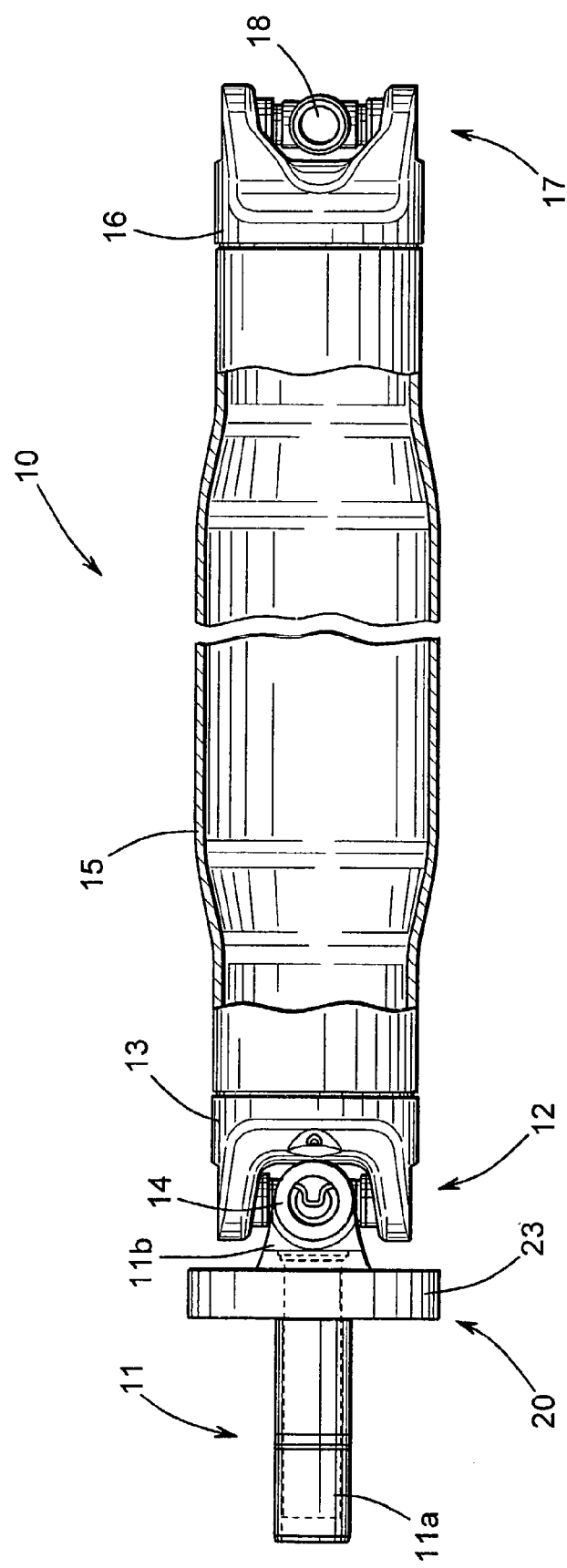
FIG. 1 is a side elevational view, partially in cross section, of a portion of a vehicular drive train system including a noise and vibration damper installed on a slip yoke in accordance with this invention.

Referring now to the drawings, there is illustrated in FIG. 1 a portion of a drive train system, indicated generally at 10, for a vehicle that is adapted to transmit rotational power from an engine/transmission assembly (not shown) to a plurality of driven wheels (not shown). The illustrated drive train system 10 is, in large measure, conventional in the art, and only those portions of the drive train system 10 that are necessary for a complete understanding of this invention will be described and illustrated. Also, the illustrated drive train system 10 is intended merely to show one representative environment in which this invention may be used. Thus, the scope of this invention is not intended to be limited for use with the specific structure for the vehicle drive train system 10 illustrated in FIG. 1 or to vehicle drive train systems in general. On the contrary, as will become apparent below, this invention may be used in conjunction with any desired component or article that rotates during use.

The engine/transmission assembly is conventional in the art and includes an externally splined output shaft (not shown) that is connected to a slip yoke, indicated generally at 11. The slip yoke 11 is conventional in the art and includes a hollow sleeve portion 11a having a smooth cylindrical outer surface and an internally splined inner surface (not shown). The internally splined inner surface of the sleeve portion 11a of the slip yoke 11 engages the externally splined output shaft of the engine/transmission assembly in a known manner. As a result, the slip yoke 11 is rotatably driven by the output shaft of the engine/transmission assembly, but is free to move axially relative thereto to a limited extent.

The slip yoke 11 further includes a yoke portion 11b that forms one part of a first universal joint, indicated generally at 12. The first universal joint 12 is also conventional in the art and includes a first tube yoke 13 that is connected to the yoke portion 11b of the slip yoke 11 by a first conventional cross assembly 14 in a known manner. The first tube yoke 13 is secured, such as by welding, to a first end of a driveshaft tube 15 for rotation therewith. The first universal joint 12 thus provides a rotational driving connection between the output shaft of the engine/transmission assembly and the first end of the driveshaft tube 15, while permitting a limited amount of angular misalignment therebetween.

A second tube yoke 16 is secured, such as by welding, to a second end of the driveshaft tube 15 for rotation therewith. The second tube yoke 16 forms one part of a second universal joint, indicated generally at 17. The second universal joint 17 is also conventional in the art and includes an end yoke (not shown) or other conventional fitting that is connected to the second tube yoke 16 by a second conventional cross assembly 18 in a known manner. The end fitting can be connected to an input shaft (not shown) of a conventional axle assembly (not shown) so as to rotatably drive wheels provided on the vehicle. The second universal joint 17 thus provides a rotational driving connection between the second end of the driveshaft tube 15 and the input shaft of the axle assembly, while permitting a limited amount of angular misalignment therebetween.

As discussed above, the drive train system 10 is frequently subjected to mechanically-generated noise and vibration as it is rotated during use. For example, it is known that the gears contained within both the engine/transmission assembly and within the axle assembly can generate undesirable noise and vibration as they mesh during use. Because the drive train system 10 is connected between the output shaft of the engine/transmission assembly and the input shaft of the axle assembly, such noise and vibration are usually transmitted thereto. Because of its relatively long physical length, the drive train system 10 can function to further amplify this undesirable noise and vibration, resulting in undesirable operational characteristics and, at least in some instances, damage to the components of the drive train system 10. The noise and vibration that is generated during operation of the drive train system 10 typically occurs at a variety of frequencies. However, the largest magnitude of such noise and vibration usually occurs at or near a single vibration frequency.

To minimize the amount of such noise and vibration that is transmitted and amplified by the drive train system 10, it is known to provide a noise and vibration damper, such as indicated generally at 20, on a component of the drive train system 10. In the illustrated embodiment, the noise and vibration damper 20 is mounted on the slip yoke 11 of the drive train system 10. However, it will be appreciated that the noise and vibration damper 20 of this invention may be mounted or otherwise provided on any desired portion of the drive train system 10. When provided on the drive train system 10, the noise and vibration damper 20 functions as a torsional or inertia damper to absorb at least some of the undesirable noise and vibration that is encountered by the drive train system 10 as it is rotated during operation. As will be explained in detail below, the noise and vibration damper 20 is preferably tuned to vibrate at a frequency that is equal to, but is 180° out-of-phase with, the above-discussed vibration frequency of the noise and vibration that is desired to be dampened. Thus, the noise and vibration damper 20 can function as a tuned absorber that absorbs the undesirable noise and vibration applied to the drive train system 10 by converting the mechanical energy thereof into heat energy that is dissipated into the atmosphere to achieve the desired damping effect.

The structure of the noise and vibration damper 20 of this invention is illustrated in detail in FIGS. 2 and 3. As shown therein, the noise and vibration damper 20 includes an inner annular member, indicated generally at 21, that is mounted on the slip yoke 11. The inner annular member 21 of the noise and vibration damper 20 includes a first, generally axially extending portion 21a, a second, generally radially extending portion 21b, and a third, generally axially extending portion 21c. The first portion 21a of the inner member 21 extends generally axially relative to a rotational axis 11c of the slip yoke 11 and engages an outer surface of the slip yoke 11. In the illustrated embodiment, the first portion 21a of the inner member 21 engages the yoke portion 11b of the slip yoke 11 in a press fit relationship, although such is not required. The second portion 21b of the inner member 21 of the noise and vibration damper 20 extends generally radially outwardly from the first portion 21a. The third portion 21c of the inner member 21 of the noise and vibration damper 20 also extends generally axially relative to the rotational axis 11c of the slip yoke 11 and is located a predetermined radial distance R from such rotational axis 11c.

The noise and vibration damper 20 further includes an intermediate member 22 that extends about the third portion 21c of the inner member 21. The intermediate member 22 can be formed from any desired material that possesses a certain amount of elasticity or resilience. For example, the intermediate member 22 can be formed from a conventional polybutadiene polymer material, such as SAE J200 MSAA 710 A13 B13 F17 Z1 Z2 material. However, as will be explained further below, the selection of the specific material can be varied. The intermediate member 22 can, for example, be annular in shape and disposed about the third portion 21c of the inner member 21. Alternatively, the intermediate member 22 can be formed generally flat and rectangular in shape and be wrapped about the third portion 21c of the inner member 21. Lastly, the noise and vibration damper 20 includes an annular outer member 23 that extends about the intermediate member 22. The outer member 23 is preferably sized such that the intermediate member 22 is compressed between it and the third portion 21c of the inner member 21. Thus, the inner member 21, the intermediate member 22, and the outer member 23 are frictionally retained together to form the noise and vibration damper 20.

However, the intermediate member 22 and the outer member 23 can be secured to the inner member 21 by any other conventional means, such as by adhesive bonding. The outer member 23 extends generally axially relative to the rotational axis 11c of the slip yoke 11 by a predetermined axial distance D.

The inner member 21 of the noise and vibration damper 20 is preferably formed from a sheet of material that is deformed to a desired shape. As used herein, the term "sheet of material" indicates a piece of material that is generally flat and planar in configuration, having a thickness that is relatively small in comparison to its overall length and/or width. For example, the sheet of material used to form the illustrated inner member 21 can be a sheet of sixteen gauge steel having a thickness of approximately 0.0598 inch or 1.519 mm. However, other gauges of steel and other materials may be employed. Also, as used herein, the term "deformed" indicates that the sheet of material is re-configured from its original shape (flat and planar, for example) to a desired shape (such as the shape of the inner member 21 shown in FIGS. 2 and 3, for example) without the removal of material (or at least a significant amount of material) therefrom. For example, the inner member 21 of the noise and vibration damper 20 can be initially formed from a flat, annular sheet of a metallic material that is stamped or otherwise deformed to the shape illustrated in FIGS. 2 and 3. However, the term "deformed" is not intended to preclude all removal of material from the sheet of material. Rather, the term "deformed" indicates that material is not removed from the sheet of material during its re-configuration from its original shape to its desired shape. For example, it is contemplated that material may be removed from the sheet of material ancillary to its re-configuration from its original shape to its desired shape (i.e., material may be removed from a generally rectangular sheet of material to initially form the flat, annular sheet of material that is subsequently stamped or otherwise deformed to the shape illustrated in FIGS. 2 and 3). Preferably, the inner member 21 of the noise and vibration damper 20 is formed from a single piece of material, although such is not required.

The outer member 23 of the noise and vibration damper 20 is preferably formed from a tube of material having a length that is selected to provide the desired dampening frequency. As used herein, the term "tube" indicates a piece of material that is generally hollow and cylindrical in shape, having a wall thickness that is relatively small in comparison to its overall length. For example, the outer member 23 of the noise and vibration damper 20 can be formed from a hollow, cylindrical tube of a metallic material having a wall thickness of approximately 0.120 inch or 3.048 mm that is cut or otherwise provided at a length that is selected to provide the desired dampening frequency. Preferably, the outer member 23 of the noise and vibration damper 20 is formed from a single piece of material, although such is not required.

Figure 4:
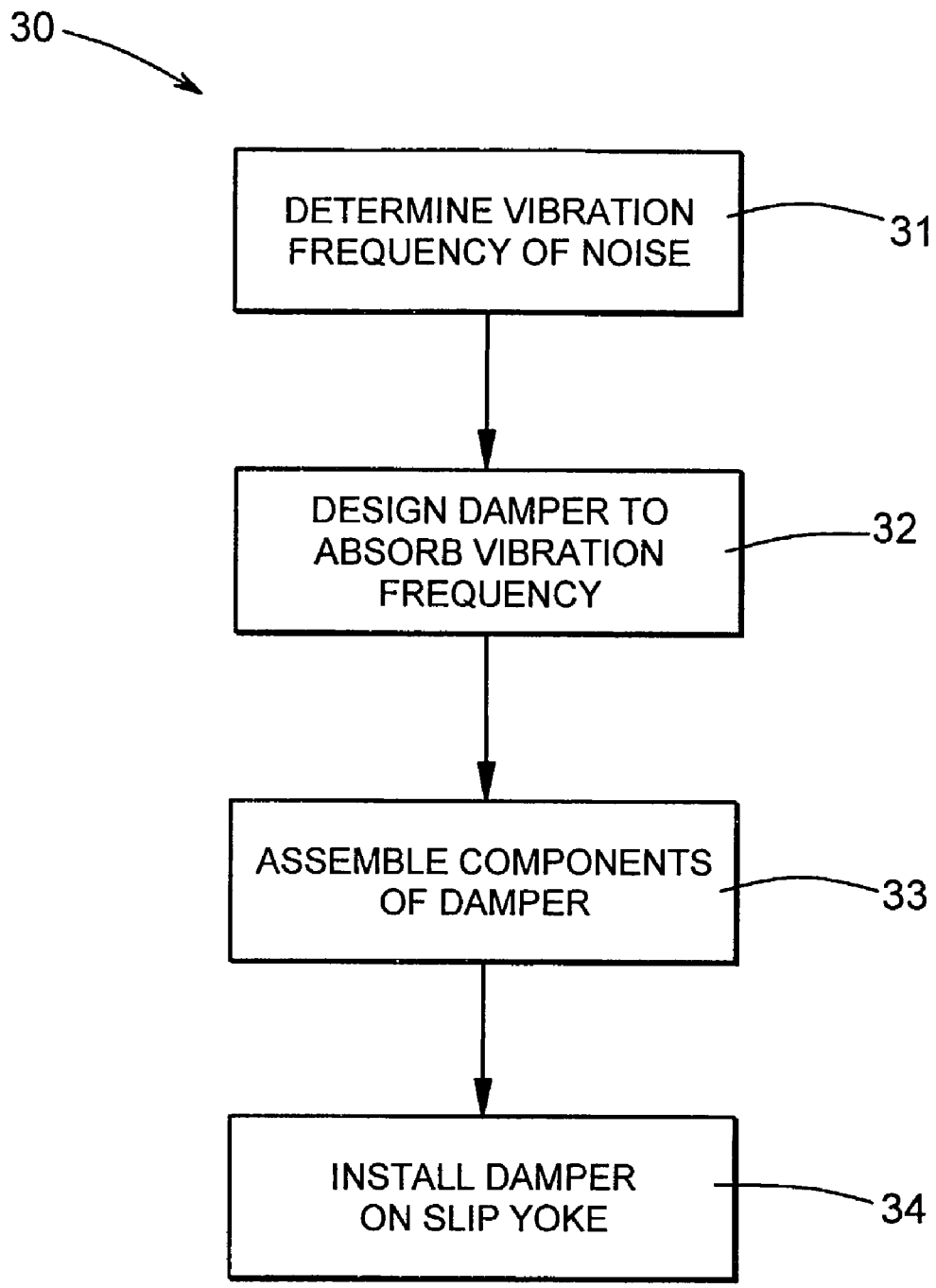
FIG. 4 is a flow chart of a method in accordance with this invention for manufacturing and installing the noise and vibration damper illustrated in FIGS. 1, 2, and 3 on the drive train system.

FIG. 4 is a flow chart of a method, indicated generally at 30, in accordance with this invention for manufacturing and installing the noise and vibration damper 20 illustrated in FIGS. 1, 2, and 3 on the drive train system 10. In a first step 31 of the method 30, the vibration frequency of the drive train system 10 is determined. This determination is conventional in the art and can be accomplished in any desired manner. It is known that a wide variety of factors that can contribute to determine the vibration frequency that is generated and transmitted to the drive train system 10 for a given vehicle or other structure. Thus, it has been found to be convenient to determine the vibration frequency of the drive system 10 through the use of empirical measurements. This typically involves installing the drive train system 10 on a vehicle and operating it at a variety of rotational speeds. At each different rotational speed, the magnitude of the vibrations that are present in the drive train system 10 are measured using conventional sensing structures and techniques. However, other methods of determining the vibration frequency of the drive train system 10 can be employed. As mentioned above, the noise and vibration that is generated during operation of the drive train system 10 typically occurs at a variety of frequencies. However, the largest magnitude of such noise and vibration usually occurs at or near a single vibration frequency.

Once the vibration frequency of the drive train system 10 has been determined, the components of the noise and vibration damper 20 are next designed to absorb it, as shown in a second step 32 of the method 30. This can be accomplished in several ways. The natural resonant frequency of the noise and vibration damper 20 is dependent upon a variety of factors. This invention contemplates that the natural resonant frequency of the noise and vibration damper 20 can be adjusted by varying either or both of (1) the predetermined radial distance R that the third portion 21c of the inner member 21 of the noise and vibration damper 20 is located from the rotational axis 11c of the slip yoke 11, and (2) the predetermined axial distance D that the outer member 23 of the noise and vibration damper 20 extends. In both instances, the overall weight distribution of the noise and vibration damper 20 is altered. As a result, the rotational inertia (and, therefore, the natural resonant frequency) of the noise and vibration damper 20 can be altered to absorb the undesirable noise and vibration applied to the drive train system and to minimize the amount of such noise and vibration that is transmitted and amplified by the drive train system at the previously determined vibration frequency of the drive system 10.

As discussed above, the inner member 21 of the noise and vibration damper 20 is preferably formed from a flat, circular sheet of a metallic material that is stamped or otherwise deformed to the shape illustrated in FIGS. 2 and 3. The predetermined radial distance R can be varied during the manufacture of the inner member 21. When the magnitude of the predetermined radial distance R is increased, the weight of the outer member 23 of the noise and vibration damper 20 is located a larger distance from the rotational axis 11c of the slip yoke 11. As a result, the rotational inertia of the noise and vibration damper 20 is increased, and the natural resonant frequency thereof is decreased. Conversely, when the magnitude of the predetermined radial distance R is decreased, the weight of the outer member 23 of the noise and vibration damper 20 is located a smaller distance from the rotational axis 11c of the slip yoke 11. As a result, the rotational inertia of the noise and vibration damper 20 is decreased, and the natural resonant frequency thereof is increased.

To accomplish this, the predetermined radial distance R can be varied by varying the relative sizes of the first portion 21a, the second portion 21b, and the third portion 21c of the inner member 21. Thus, for example, the predetermined radial distance R can be increased by increasing the radial extent of the second portion 21b of the inner member 21 and decreasing the axial extent of the first portion 21a or the third portion 21c (or both) of the inner member 21. Conversely, the predetermined radial distance R can be decreased by decreasing the radial extent of the second portion 21b of the inner member and increasing the axial extent of the first portion 21a or the third portion 21c (or both) of the inner member 21. In this manner, the predetermined radial distance R can be varied without changing the size of the flat, circular sheet of material. Alternatively, the predetermined radial distance R can be varied by varying the size of the flat, circular sheet of material. This would allow the radial extent of the second portion 21b of the inner member 21 to be varied without changing the axial extent of the either first portion 21a or the third portion 21c of the inner member 21. The specific amounts by which the natural resonant frequency of the noise and vibration damper 20 are increased and decreased will vary with a variety of factors (the composition of the material, for example) and can be determined in any desired manner.

As also discussed above, the outer member 23 of the noise and vibration damper 20 is preferably formed from a tube of material having a length that is selected to provide the desired dampening frequency. The predetermined axial distance D can be varied during the manufacture of the inner member 21. When the magnitude of the predetermined axial distance D is increased, the weight of the outer member 23 of the noise and vibration damper 20 is larger. As a result, the rotational inertia of the noise and vibration damper 20 is increased, and the natural resonant frequency thereof is decreased. Conversely, when the magnitude of the predetermined axial distance D is decreased, the weight of the outer member 23 of the noise and vibration damper 20 is smaller. As a result, the rotational inertia of the noise and vibration damper 20 is decreased, and the natural resonant frequency thereof is increased. To accomplish this, the outer member 23 of the noise and vibration damper 20 can be cut from a length of stock tubing to the desired predetermined axial distance D.

The next step 33 of the method 30 is to assemble the inner member 21, the intermediate member 22, and the outer member 23 to form the noise and vibration damper 20. As discussed above, the outer member 23 is preferably sized such that the intermediate member 22 is compressed between it and the third portion 21c of the inner member 21. Thus, the inner member 21, the intermediate member 22, and the outer member 23 are frictionally retained together to form the noise and vibration damper 20. However, the intermediate member 22 and the outer member 23 can be secured to the inner member 21 by any other conventional means, such as by adhesive bonding. In the final step 34 of the method, the noise and vibration damper 20 is installed on the slip yoke 11 or other component of the drive train system 10. As discussed above, the first portion 21a of the inner member 21 can be sized to engage the yoke portion 11b of the slip yoke 11 in a press fit relationship. However, the inner member 21 can be secured to the drive train system 10 in any desired manner.

Figure 5:
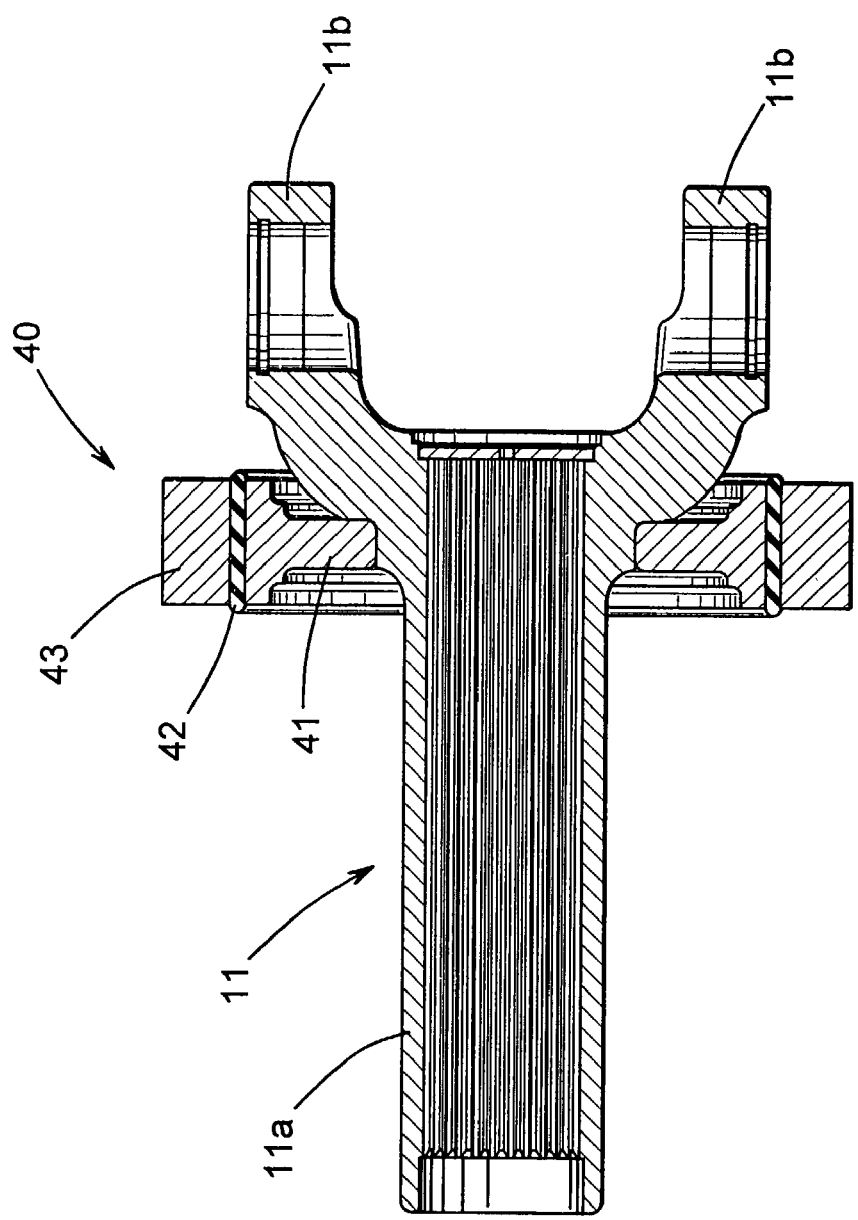
FIG. 5 is an enlarged sectional elevational view, similar to FIG. 3, of a prior art embodiment of a noise and vibration damper installed on a slip yoke.

FIG. 5 illustrates a prior art embodiment of a noise and vibration damper, indicated generally at 40, installed on the slip yoke 11 of the drive train system 10. The prior art noise and vibration damper 40 included an annular inner member 41, an intermediate elastomeric member 42 that extends about the inner member 41, and an outer member 43 that extended about the intermediate elastomeric member 42. Both the inner member 41 and the outer member 43 were formed from solid blocks of material that were machined to provide the desired shapes therefor. Because they were not formed from a "sheet of material" or a "tube of material" as described above, the inner member 41 and the outer member 43 are somewhat heavier and more expensive to manufacture than the corresponding inner member 21 and outer member 23 of the noise and vibration damper 20 of this invention. Furthermore, because they were not "deformed" as described above, the inner member 41 and the outer member 43 are somewhat more expensive to manufacture than the corresponding inner member 21 and outer member 23 of the noise and vibration damper 20 of this invention.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

What is claimed is:

1. A method of manufacturing a noise and vibration damper for use with a rotatable structure having a vibration frequency comprising the steps of:
   (a) providing an inner member;
   (b) providing an intermediate member formed from an elastomeric material that extends about the inner member; and
   (c) providing an outer member that extends about the intermediate member, wherein either said step (a) is performed by forming the inner member from a sheet of material that is selected to provide a desired dampening frequency that is based upon the vibration frequency of the rotatable structure, or said step (c) is performed by forming the outer member from a tube of material having a length that is selected to provide a desired dampening frequency that is based upon the vibration frequency of the rotatable structure.

2. The method defined in claim 1 wherein said step (a) is performed by forming the inner member from the sheet of material.

3. The method defined in claim 1 wherein said step (a) is performed by forming the inner member from the sheet of material having a first portion that extends generally axially relative to an axis of rotation of the noise and vibration damper, a second portion that extends generally radially relative to said axis of rotation, and a third portion that extends generally axially relative to said axis of rotation.

4. The method defined in claim 1 wherein said step (a) is performed by forming the inner member from the sheet of material that has been deformed to a desired shape.

5. The method defined in claim 1 wherein said step (a) is performed by forming the inner member from the sheet of material that has been deformed to have a first portion that extends generally axially relative to an axis of rotation of the noise and vibration damper, a second portion that extends generally radially relative to said axis of rotation, and a third portion that extends generally axially relative to said axis of rotation.

6. The method defined in claim 1 wherein said step (c) is performed by forming the outer member from the tube of material having a length that is selected to provide a desired dampening frequency.

7. The method defined in claim 1 wherein both said step (a) is performed by forming the inner member from the sheet of material, and said step (c) is performed by forming the outer member from the tube of material having a length that is selected to provide a desired dampening frequency.

8. A method of manufacturing a combined noise and vibration damper and rotatable structure comprising the steps of:
   (a) determining a vibration frequency of the rotatable structure;
   (b) providing a noise and vibration damper including an inner member, an intermediate member that extends about the inner member, and an outer member that extends about the intermediate member, wherein either the inner member is formed from a sheet of material or the outer member is formed from a tube of material;
(c) either deforming the sheet of material forming the inner member or selecting the length of the tube of material forming the outer member to provide a desired dampening frequency for the noise and vibration damper that is based upon the vibration frequency of the rotatable structure; and
(d) installing the noise and vibration damper on the rotatable structure.

9. The method defined in claim 8 wherein said step (c) is performed by deforming the sheet of material forming the inner member.

10. The method defined in claim 9 wherein said step (c) is performed by adjusting a radial distance of a portion of the inner member.

11. The method defined in claim 8 wherein said step (c) is performed by selecting the length of the tithe of material forming the outer member.

* * * * *

UNITED STATES PATENT AND TRADEMARK OFFICE
CERTIFICATE OF CORRECTION

PATENT NO. : 7,178,423 B2
APPLICATION NO. : 10/306394
DATED : February 20, 2007
INVENTOR(S) : Douglas E. Breese et al.

It is certified that error appears in the above-identified patent and that said Letters Patent is hereby corrected as shown below:

Claim 11, column 10, line 9, change "tithe" to -- tube --.

Signed and Sealed this

Seventeenth Day of April, 2007

JON W. DUDAS
*Director of the United States Patent and Trademark Office*